United States Patent Office 2,784,177
Patented Mar. 5, 1957

---

2,784,177

PRODUCTION OF PASTE-FORMING POLYVINYL CHLORIDE

Kenneth Henry Charles Bessant, Banstead, Anthony Grayson Goodchild, Long Ditton, Charles Edward Hollis, Ewell, Henry Malcolm Hutchinson, Banstead, and Stanley Gordon Kemp, Merton, England, assignors to The Distillers Company Limited, Edinburgh, Scotland, a British company No Drawing. Application July 2, 1953,
Serial No. 365,766

Claims priority, application Great Britain July 22, 1949

7 Claims. (Cl. 260—92.8)

This invention relates to the polymerisation of vinyl chloride in aqueous emulsion in the presence of an emulsifying agent and a water-soluble peroxy catalyst to produce a paste-forming polymer.

The emulsion polymerisation of vinyl chloride with water-soluble catalysts is a well known, commercially used process generally yielding a stable, non-settling colloidal dispersion of polymer, or latex, from which the polymer may be recovered as a white powder by coagulating and drying at 50–60° C., or by spray drying at these temperatures. Powdery polymers produced in this way cannot, however, be dispersed at ordinary temperatures in approximately 65 to 100% of their weight of plasticiser such as dioctyl phthalate or tricresyl phosphate to give a smooth creamy mixture or paste which is free-flowing and spreadable and remains so for a sufficient length of time to be useful in this form and, in order to confer on the polymer these desirable paste-forming properties, specific heat-treatment is necessary as described in British Patent No. 589,715 and United States Patent No. 2,445,042. A further known polymerisation process, commonly referred to as dispersion polymerisation, is characterised by the use of a monomer-soluble catalyst and a coarser aqueous dispersion of the monomer, maintained by mechanical means with the aid of a dispersing agent, but the resulting polymers do not have paste-forming characteristics as above defined and are obtained as a granular sediment rather than as a latex.

It has now been found that paste-forming vinyl chloride polymers may be obtained directly when the polymerisation conditions are adjusted to be intermediate between those described in the foregoing paragraph, the emulsion being at the point of incipient coagulation at least towards the end of the polymerisation and maintained by vigorous agitation. The product, in this case, comprises varying proportions of finely divided sediment and latex, the latter being more dilute than with true emulsion polymers, and generally a quantity of hydrophobic powdery polymer on the liquid surface and some solid deposit on the walls of the vessel. From this mixture, the paste-forming polymer may readily be isolated by completing the coagulation, drying and removing any particles retained on a sieve having a mesh in the range 20 to 100.

It is believed that the success of the novel process resides in the fact that polymer particles smaller than about $0.5\mu$ diameter, which occur in appreciable amounts in latices prepared in emulsion with water-soluble catalysts, are largely absent when the polymerisation is conducted, at least in the later stages, at the point of incipient coagulation as characterised by the formation of a quantity of granular material in addition to finely divided polymer, and that these smaller particles are responsible for the sticky nature and high, progressively increasing viscosity of compositions produced from plasticisers and emulsion polymers of the kind described which have not been subjected to the heat treatment of British Patent No. 589,715. Whether or not this represents the correct explanation of the experimental results described herein, it has been found that, when the conditions under which the polymerisation is carried out are deliberately adjusted to give a polymer of average particle size rather larger than that resulting from prior emulsion processes, but not so large as that resulting from prior dispersion processes, suitably $0.5–3\mu$ with a minimum of material smaller than this, the dried powdery product can be dispersed in about 65 to 100% of its weight of plasticiser to give a fluid, spreadable paste of low viscosity and good ageing properties.

The main factors which influence the polymer particle size and emulsion stability are (1) the concentration of the emulsifying agent, (2) the type and degree of agitation (3) the phase volume ratio. Other factors include the reaction temperature, pH of the aqueous phase, and the presence or absence of electrolytes other than the catalyst and surface tension regulators such as alcohols. According to this invention, these factors are adjusted to give an emulsion of low stability and yield a product resembling neither the stable latex characteristic of true emulsion polymers, nor the granular deposit and clear supernatent liquid obtained by the standard dispersion polymerisation process. The individual effects of these various factors are described below.

There is no specific requirement for the type of emulsifying agent except that it should be of the anionic type. The most useful types are the —$SO_2.OM$ containing types, where M is an alkali metal or an ammonium ion, and the salts of half esters of phthalic acid with alkanols of 5 to 18 carbon atoms. Examples of the first type are sodium and ammonium lauryl sulphates, sodium cetyl sulphate, sodium salt of sulphated methyl or ethyl oleate, and turkey red oil, while examples of the second type include sodium amyl phthalate, sodium lauryl phthalate, sodium cetyl phthalate, sodium stearyl phthalate and sodium salts of phthalic acid esters of mixed fatty alcohols. The latter type of emulsifying agent are compatible with the polymer. The alkali metal and ammonium salts of mono-esters of phthalic acid or of lower homologues thereof with $C_4$–$C_{18}$, particularly $C_5$–$C_{18}$ alkanols as the emulsifying agent have the advantage of compatibility with the resulting polymer combined with an emulsifying power which can readily be adjusted as desired by regulation of the pH of the aqueous medium, e. g. from 6 to 10.

*Concentration of emulsifier.*—Lower concentrations of emulsifying agent are necessary than those normally used, and the desirable concentration range can be determined by carrying out the polymerisation at gradually decreasing levels. The optimum is generally at least 0.01% and less than 0.25% by weight on the monomer at phase volume ratios in the range 1.5:1–4:1, aqueous phase-vinyl chloride, with lower concentrations for the more efficient emulsifying agents. If desired a portion of the emulsifier may be added gradually during the polymerisation reaction.

*Type of agitation.*—Violent and turbulent agitation favours the production of polymers with good paste-forming properties, and is particularly necessary when an efficient emulsifying agent is used in substantial concentration within the above range. The particular means adopted to effect this will naturally vary with the size and shape of the vessel used.

*Phase volume ratio.*—This is a less critical factor, but improvement frequently results from the use of a relatively high proportion of monomer.

Thus, the conditions conducive to the formation of vinyl chloride paste-forming polymers are those tending to cause instability of the emulsion and have, in the past, been avoided for this reason. However, by careful adjustment of the conditions in preliminary trial runs, following the principles outlined above, the requirements for the production of paste-forming polymer without an unduly high proportion of gritty or grainy agglomerates can be established for any particular vessel. Furthermore, the efficiency or effect of the emulsifying agent may be modified, if desired, by the adjustment of the pH and incorporation of electrolytes or surface tension modifiers such as alcohols.

Any effective water-soluble vinyl chloride polymerisation catalyst may be used, such as hydrogen peroxide, the alkali and ammonium salts of peracids such as perboric, persulfuric, peracetic, perbenzoic and monoperphthalic acids, activated, where necessary, by reducing agents such as sodium sulphite as in the well known "Redox" systems, and azo-type catalysts.

The paste-forming vinyl chloride polymers produced according to this invention may be compounded in the usual way with plasticisers such as tricresyl phosphate, dihexyl phthalate, dioctyl phthalate, dibutyl phthalate or mixtures thereof, and ancillary ingredients which include heat stabilisers such as lead silicate; dyes and pigments may also be added to the dispersions or to the vinyl chloride polymers.

The following examples and comparative tests illustrate various embodiments of this invention and show the effects of the various factors hereinbefore referred to.

All viscosities of pastes given in the following examples were measured in stokes by an efflux viscometer, the relationship between stokes and poises being given by the equation stokes x density=poises. The density of the pastes in the examples employing equal weights of polymer and plasticiser is about 1.2.

EXAMPLE 1

1 litre of vinyl chloride, 2 litres of an aqueous solution of cetyl and stearyl hydrogen phthalates made by reacting equimolar proportions of phthalic anhydride and a commercial mixture of cetyl and stearyl alcohols containing approximately equal parts by weight of the two constituents, in an amount of 0.25% by weight of the vinyl chloride, the acid ester having been converted to the sodium salt to the extent of 18% by the addition of sodium hydroxide, resulting in an effective concentration of emulsifying agent of nearly 0.05%, and 0.1% by weight on the vinyl chloride of potassium persulphate, were added to a previously evacuated pressure vessel of 2 gallons capacity, and agitated by a propellor-type stirrer rotating at 425 R. P. M. while heating at 45° C. for 27 hours until the polymerisation was complete. The resulting polymer was precipitated by addition of aluminium sulphate solution, filtered, washed, dried in a stream of air at 50° C. and screened to remove the small content of gritty particles. The fine powder thus obtained, when mixed for 30 minutes in an end-runner mill with the same weight of di-(2-ethyl-hexyl) phthalate gave a fluid paste of viscosity 36.3 stokes increasing to 46.3 stokes on aging for 7 days at room temperature.

EXAMPLE 2

Vinyl chloride was polymerised as in Example 1, but using 0.1% by weight of the sodium salt of a highly sulphated methyl oleate instead of the 0.25% of the partly neutralised cetyl and stearyl hydrogen phthalates. The polymer was obtained mostly as a latex which had coagulated slightly during polymerisation as evidenced by the precipitation of a small proportion as a fine, water-repellant powder and, on recovery as previously described, it could be dispersed in di-(2-ethyl-hexyl) phthalate to give a stable, spreadable paste.

Similarly, the use of cetyl and stearyl hydrogen phthalates, converted to the sodium salts to the extent of 18% and in an amount of 0.5% on the monomer i. e. about 0.1% active emulsifying agent, gave a polymer forming a paste, as described above, having an initial viscosity of 68.2 stokes increasing to 83.2 stokes after 7 days at room temperature, while an increase in the emulsifier to 0.7% on the monomer resulted in a polymer incapable of giving a spreadable paste without preliminary sintering.

EXAMPLE 3

Vinyl chloride was polymerised precisely as described in Example 1, except that 2.5% by weight thereon of carbon tetrachloride was added, to give a polymer which formed a paste of viscosity 97 stokes at 25° C. when mixed with an equal weight of di-(2-ethyl-hexyl) phthalate. However, when the run was repeated with the stirrer revolving at only 200 R. P. M., the resulting polymer could not be dispersed in the same amount of plasticiser to give a fluid paste.

EXAMPLES 4-6

Vinyl chloride was polymerised in a 2 gallon stainless steel pressure vessel provided with a centrally located propellor type stirrer and a water jacket, under the following conditions: phase volume ratio (water to vinyl chloride) 2:1, catalyst 0.1% by weight potassium persulphate on vinyl chloride, jacket temperature 45° C., stirring 425 R. P. M., emulsifier cetyl and stearyl hydrogen phthalates 18% converted to sodium salt.

| Emulsifier concentration, percent by weight on monomer | 0.5 | 0.25 | 0.1 |
|---|---|---|---|
| Yield, percent by weight on monomer | 65 | 71 | |
| Paste viscosity (stokes): | | | |
| Initial | 68.2 | 36.3 | 12.1 |
| 7 day | 83.2 | 46.3 | 19.0 |

The pastes in these and the following examples were made up from equal weights of the polymer and di-2-ethyl-hexyl phthalate.

EXAMPLES 7-8

Vinyl chloride was polymerised under the following conditions in the same 2 gallon vessel as was used in Examples 4-6, using the same phase volume ratio with potassium persulphate as catalyst and 0.25% by weight on the vinyl chloride of the same emulsifier.

| | | |
|---|---|---|
| Reaction temperature, °C | 45 | 50 |
| Catalyst concentration, percent by weight on monomer | 0.2 | 0.1 |
| Stirrer speed | 425 | 425 |
| Yield, percent by weight on monomer | 60 | 56 |
| Paste viscosity (stokes): | | |
| Initial | 44.3 | 57.6 |
| 7 day | 44.3 | 64.1 |

EXAMPLE 9

Vinyl chloride was polymerised under the following conditions in the same 2 gallon vessel as was used in Examples 4-6. Phase volume ratio 2:1, catalyst 0.1% by weight of potassium persulphate, jacket temperature 40° C. stirring 425 R. P. M., emulsifier cetyl and stearyl hydrogen phthalates 18% converted to sodium salt 0.1%, modifier 2.5% by weight on monomer of carbon tetrachloride.

Yield, percent by weight on monomer _____ 60
Paste viscosity (stokes), initial _____ 51.9
7 day _____ 53.5

EXAMPLES 10 AND 11

Vinyl chloride was polymerised under the following conditions in the same 2 gallon vessel as was used in Examples 4-6. The emulsifier was sodium lauryl sulphate.

| Emulsifier concentration, percent by weight on monomer | 0.01 | 0.02 |
|---|---|---|
| Yield, percent by weight on monomer | 70 | 61 |
| Paste viscosity (stokes): | | |
| Initial | 50.2 | 66 |
| 7 day | 59.3 | 205.5 |

Other variables were as set out in Examples 4-6.
In the following experiments the polymeriser was a 25 gallon vessel equipped with an off centre stirrer of the type indicated.

EXAMPLE 12

Vinyl chloride was polymerised under the following conditions. Phase volume ratio 2:1, catalyst 0.1% by weight on monomer of potassium persulphate, reaction temperature 45° C., stirring 450 R. P. M., 10 inch diameter Bromigen type, emulsifier cetyl and stearyl hydrogen phthalates 18% converted to sodium salt.

| | |
|---|---|
| Emulsifier concentration per cent by weight on monomer | 0.25 |
| Yield, percent by weight on monomer | 80 |
| Paste viscosity (stokes), initial | 31 |
| 7 day | 45 |

EXAMPLES 13-16

Vinyl chloride was polymerised under the following conditions. Phase volume ratio 2:1, catalyst 0.1% on monomer of potassium persulphate, reaction temperature 45° C., emulsifier cetyl and stearyl hydrogen phthalates partially converted to the sodium salt 0.7% by weight on monomer, stirring 10 inch diameter Bromigen type.

| | | | | |
|---|---|---|---|---|
| Emulsifier, percent converted to Na salt | 40 | 30 | 30 | 30 |
| Stirring rate | 450 | 450 | 450 | 690 |
| Yield, percent by weight on monomer | 84 | 84 | 84 | 81 |
| Paste viscosity (stokes): | | | | |
| Initial | 42.6 | 22.5 | 54 | 60 |
| 7 day | 69.5 | 40.6 | 70 | 78.4 |

EXAMPLES 17-20

Vinyl chloride was polymerised under the following conditions. Phase volume ratio 2:1, catalyst 0.1% by weight on monomer of potassium persulphate, reaction temperature 45° C., stirring 450 R. P. M. 8 inch diameter Bromigen type, emulsifier sodium lauryl sulphate.

| | | | | |
|---|---|---|---|---|
| Emulsifier concentration, percent by weight on monomer | 0.03 | 0.05 | 0.07 | 0.10 |
| Yield, percent by weight on monomer | 88 | 85 | 82 | 86 |
| Paste viscosity (stokes): | | | | |
| Initial | 35 | 23.6 | 30.0 | 108 |
| 7 day | 45.5 | 67.0 | 175 | >200 |

EXAMPLES 21-23

Vinyl chloride was polymerised under the following conditions. Phase volume ratio 2:1, catalyst 0.1% by weight of monomer of potassium persulphate, reaction temperature 45° C., emulsifier sodium lauryl sulphate.

| Stirring type | Marine Propeller | Bromigen | Bromigen |
|---|---|---|---|
| Diameter inches | 6 | 10 | 10 |
| Speed | 690 | 450 | 690 |
| Emulsifier concentration, percent by weight on monomer | 0.05 | 0.05 | 0.10 |
| Yield, percent by weight on monomer | 78 | 85 | 86 |
| Paste viscosity (stokes): | | | |
| Initial | 45.2 | 16.3 | 62.5 |
| 7 day | 63 | 20.6 | 81.8 |

EXAMPLES 24-26

Vinyl chloride was polymerised using sodium lauryl sulphate as emulsifier, part of which was added continuously during the polymerisation. Phase volume ratio 2:1, catalyst 0.1% on monomer of potassium persulphate, reaction temperature 45° C., stirring 450 R. P. M. 8 inch diameter Bromigen type.

| | | | |
|---|---|---|---|
| Emulsifier concentration, percent by weight on monomer: | | | |
| Initial | 0.035 | 0.0125 | 0.005 |
| Added during run | 0.035 | 0.057 | 0.065 |
| Yield, percent by weight on monomer | 85 | 83 | 84 |
| Paste viscosity (stokes): | | | |
| Initial | 41 | 34.5 | 49 |
| 7 day | 71.5 | 40.7 | 57.0 |

This application is a continuation-in-part of copending application Serial No. 173,226, filed July 11, 1950, now abandoned.

We claim:

1. A process for production of a paste-forming vinyl chloride homopolymer which comprises polymerizing vinyl chloride in an aqueous emulsion containing about 0.01 to about 0.25% by weight on the vinyl chloride of an anionic emulsifying agent, and a water-soluble polymerization catalyst, the ratio of the aqueous phase to the vinyl chloride in the emulsion being between about 1.5:1 and about 4:1, while maintaining the emulsion at the point of incipient coagulation by means of violent agitation of the emulsion during polymerization, whereby an emulsion having a preponderance of particles having a size in the range 0.5–3 mu is obtained, and finally removing any particles having a particle size greater than 150 mu.

2. A process according to claim 1 wherein the emulsifying agent contains the grouping $-SO_2.OM$ in its molecular structure where M represents a member of the group consisting of an alkali metal and an ammoniun ion.

3. A process according to claim 2 wherein the polymerisation is carried out at a pH between about 3 and about 12.

4. A process according to claim 1 wherein the emulsifying agent is selected from the group consisting of the alkali metal and ammonium salts of mono-esters of phthalic acid with alkanols having carbon atoms in the range $C_5$ to $C_{18}$.

5. A process for production of a paste-forming vinyl chloride homopolymer which comprises polymerizing vinyl chloride in an aqueous emulsion containing about 0.01 to about 0.1% of sodium lauryl sulphate by weight on the vinyl chloride and a water soluble polymerization catalyst, the ratio of the aqueous phase to the vinyl chloride being about 2:1, while maintaining the emulsion at the point of incipient coagulation by means of violent agitation of the emulsion during polymerization, whereby an emulsion having a preponderance of particles having a size in the range 0.5–3 mu is obtained, and finally removing any particles having a particle size greater than 150 mu.

6. A process for production of a paste-forming vinyl chloride homopolymer which comprises polymerizing vinyl chloride in an aqueous emulsion containing about 0.01% to about 0.25% of sulphated methyl oleate sodium salt by weight on the vinyl chloride and a water soluble polymerization catalyst, the ratio of the aqueous phase to the vinyl chloride being about 2:1, while maintaining the emulsion at the point of incipient coagulation by means of violent agitation of the emulsion during polymerization, whereby an emulsion having a preponderance of particles having a size in the range 0.5–3 mu is obtained, and finally removing any particles having a particle size greater than 150 mu.

7. A process for production of a paste forming vinyl chloride homopolymer which comprises polymerizing vinyl chloride in an aqueous emulsion containing about 0.02 to about 0.25% of sodium cetyl and stearyl phthalates by weight on the vinyl chloride and a water soluble polymerization catalyst, the ratio of the aqueous phase to the vinyl chloride being about 2:1, while maintaining the emulsion at the point of incipient coagulation by means of violent agitation of the emulsion during polymerization, whereby an emulsion having a preponderance of particles having a size in the range of 0.5–3 mu is obtained, and finally removing any particles having a particle size greater than 150 mu.

References Cited in the file of this patent

UNITED STATES PATENTS 2,520,959    Powers    Sept. 5, 1950
2,553,916    Halbig    May 22, 1951